US012072072B2

(12) United States Patent
Lin

(10) Patent No.: US 12,072,072 B2
(45) Date of Patent: Aug. 27, 2024

(54) DECORATIVE LAMP STRING AND METHOD FOR MANUFACTURING SAME

(71) Applicant: Encai Lin, Taizhou (CN)

(72) Inventor: Encai Lin, Taizhou (CN)

( * ) Notice: Subject to any disclaimer, the term of this patent is extended or adjusted under 35 U.S.C. 154(b) by 0 days.

(21) Appl. No.: 17/567,053

(22) Filed: Dec. 31, 2021

(65) Prior Publication Data

US 2023/0417378 A1 Dec. 28, 2023

(51) Int. Cl.

| | |
|---|---|
| ***F21S 4/26*** | (2016.01) |
| ***F21S 4/15*** | (2016.01) |
| *F21W 121/00* | (2006.01) |
| *F21Y 107/70* | (2016.01) |

(52) U.S. Cl.

CPC . *F21S 4/26* (2016.01); *F21S 4/15* (2016.01); *F21W 2121/00* (2013.01); *F21Y 2107/70* (2016.08)

(58) Field of Classification Search

CPC ...... F21S 4/20–26; F21S 4/10; F21Y 2107/70

See application file for complete search history.

(56) References Cited

U.S. PATENT DOCUMENTS 10,578,260 B1 * 3/2020 Chen .................... F21V 21/002
2003/0231487 A1 * 12/2003 Chien ...................... B60Q 1/26 362/103

FOREIGN PATENT DOCUMENTS

WO WO-2018087072 A1 * 5/2018 ................ F21S 4/24

OTHER PUBLICATIONS

Innovation Q+ NPL Search (Year: 2024).*

* cited by examiner

*Primary Examiner* — Anabel Ton

(57) ABSTRACT

The present disclosure provides a decorative lamp string and a method for manufacturing the same. The decorative lamp string includes a wire and a supporting strip. The wire includes a plurality of lamps and a plurality of wire portions. The plurality of lamps are positioned along the wire between the plurality of wire portions. The wire winds around the supporting strip in a spiral fashion. At least one part of the wire is embedded in the supporting strip.

17 Claims, 10 Drawing Sheets

DECORATIVE LAMP STRING AND METHOD FOR MANUFACTURING SAME

FIELD OF THE INVENTION

The present disclosure relates generally to the decorative lamp technology field, and more specifically to a decorative lamp string and a method for manufacturing the same.

BACKGROUND OF THE INVENTION

With the improvement of living standards, people have higher and higher requirements for the living environment. In festivals, parties and other scenes, decorations such as lamp strings, wool tops, sequins and balloons are usually used to decorate the environment and set off the atmosphere. Among them, the festival lamp string has become the first choice to add a festive atmosphere because of its various shapes, colorful lights, and decorative effect of night lighting. It is widely used in indoor, square, lawn, trees and other occasions for decoration, playing a good decorative effect.

The existing lamp strings usually wrap or bind bare lamps on the fixtures. Conductive wires between the lamp are directly exposed, and the exposed conductive wires are not beautiful and appear abrupt, which affects the decorative effect.

Therefore, the disclosure provides a decorative lamp string, which can effectively solve the above problems by combining a lamp string with a wool strip.

SUMMARY OF THE INVENTION

In order to overcome the disadvantage of the existing lamp string, the present disclosure provides a decorative lamp string, which has the advantages of simple structure and good atmosphere effect.

The present disclosure adopts the following technical solution: a decorative lamp string including a supporting strip; and a lamp string including a plurality of lamps and a wire connected between two adjacent lamps. The wire comprises a plurality of wire portions, and the plurality of lamps are positioned along the wire between the plurality of wire portions. The wire is wound around the supporting strip in a spiral fashion, and at least one part of the wire is embedded in the supporting strip.

Further, the supporting strip includes a supporting portion and a lint portion, the lint portion surrounds the supporting portion, and at least a part of the wire is embedded in the lint portion.

Further, the thickness of the lint portion is greater than or equal to the diameter of the wire.

Further, the lint portion comprises a plurality of lint lines, a connecting end of the lint line is connected to the supporting portion, and a free end of the lint line extends away from the supporting portion.

Further, the supporting strip is made of PVC, PE or PP cotton.

Further, the decorative lamp string includes a connecting head electrically connected to the lamp string and configured to connect the lamp string to a main power supply.

Further, the decorative lamp string includes an adjusting device electrically connected to the lamp string.

Further, the adjusting device includes a switching element used for connecting or disconnecting the lamp string to a power supply.

Further, the lamp string is a copper wire lamp string.

Further, the cross-sectional area of the wire is not greater than 0.2 square mm.

The present disclosure also adopts the following technical solution: a method for manufacturing a decorative lamp string including providing a lamp string and a supporting strip, winding the wire around the supporting strip in a spiral fashion and embedding the wire in the supporting strip.

Further, the supporting strip includes a supporting portion and a lint portion, the lint portion surrounds the supporting portion, and at least a part of the wire is embedded in the lint portion.

Further, the thickness of the lint portion is greater than or equal to the diameter of the wire.

Further, the lint portion comprises a plurality of lint lines, a connecting end of the lint line is connected to the supporting portion, and a free end of the lint line extends away from the supporting portion.

Further, the supporting strip is made of PVC, PE or PP cotton.

Further, the decorative lamp string further includes a connecting head electrically connected to the lamp string and configured to connect the lamp string to a power supply.

Further, the decorative lamp string includes an adjusting device electrically connected to the lamp string.

Further, the adjusting device includes a switching element used for connecting or disconnecting the lamp string to a power supply.

Further, the lamp string is a copper wire lamp string.

Further, the cross-sectional area of the wire is not greater than 0.2 square mm.

The present disclosure also has the beneficial effects: through the above structure, the wire winds around the supporting strip in the spiral fashion and is embedded in the supporting strip, which can effectively hide the wire of the lamp string, prevent the wire from being exposed, and improve the beauty of the product. At the same time, because there are many lint lines on the surface of the supporting strip, light from the lamp string shines on the supporting strip forming a diffuse reflection, making lighting effect of the lamp string more significant, effectively improving beauty of the lamp string and enhancing the atmosphere effect of the lamp string. Moreover, the combination of the lamp string and the supporting strip can also improve stability of the product and make structure of the product more stable. The supporting strip can support the lamp string, so as to better wrap and fix on a fixed object, forming more diversified shapes, such as a dear shape, a cobweb shape, etc., to further improve decorative effect of the decorative lamp string.

BRIEF DESCRIPTIONS OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE ILLUSTRATED EMBODIMENT

Figure 1:
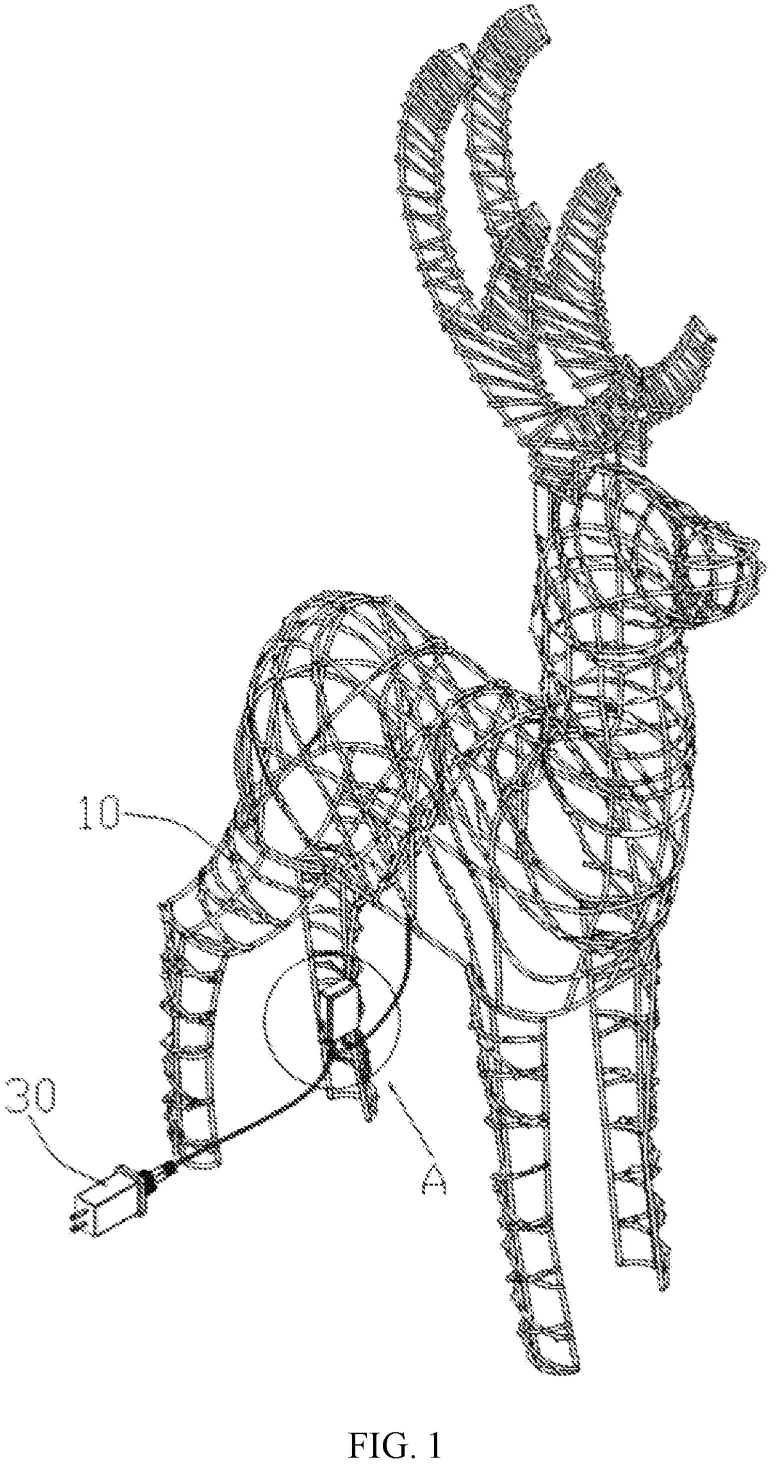
FIG. 1 is an explosive view of a decorative lamp string according to a first embodiment of the present disclosure.
Figure 2:
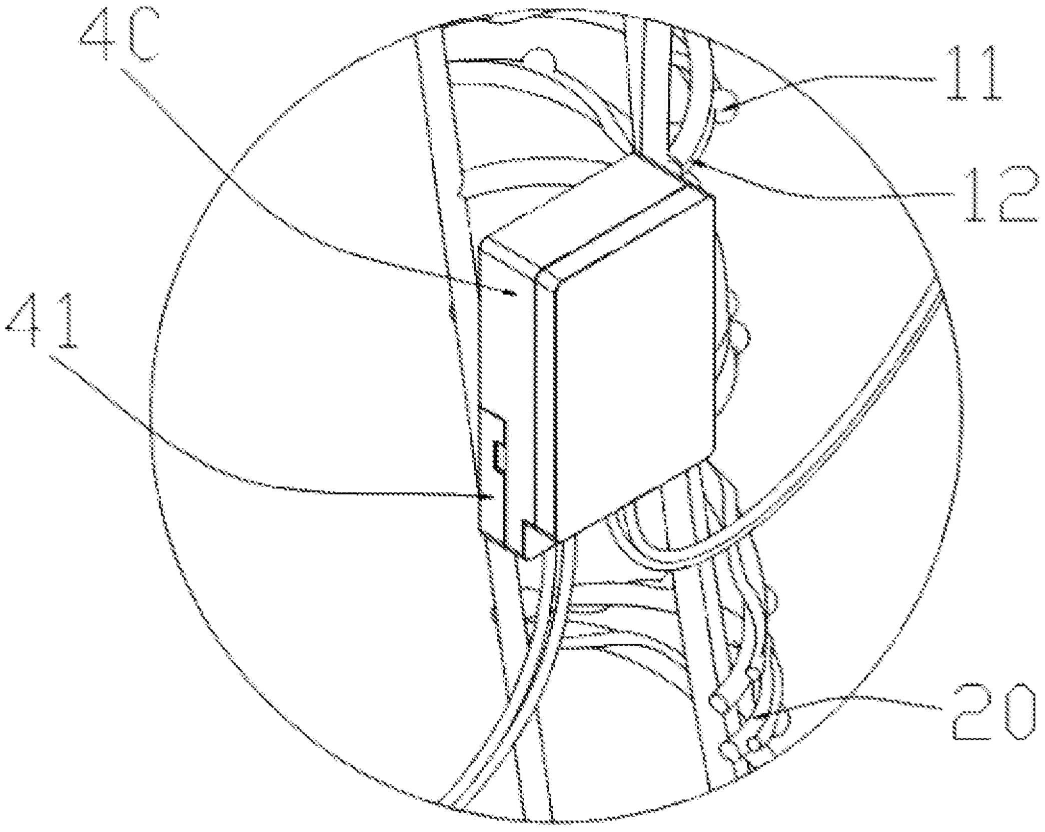
FIG. 2 is an enlarged view of part A of FIG. 1.
Figure 3:
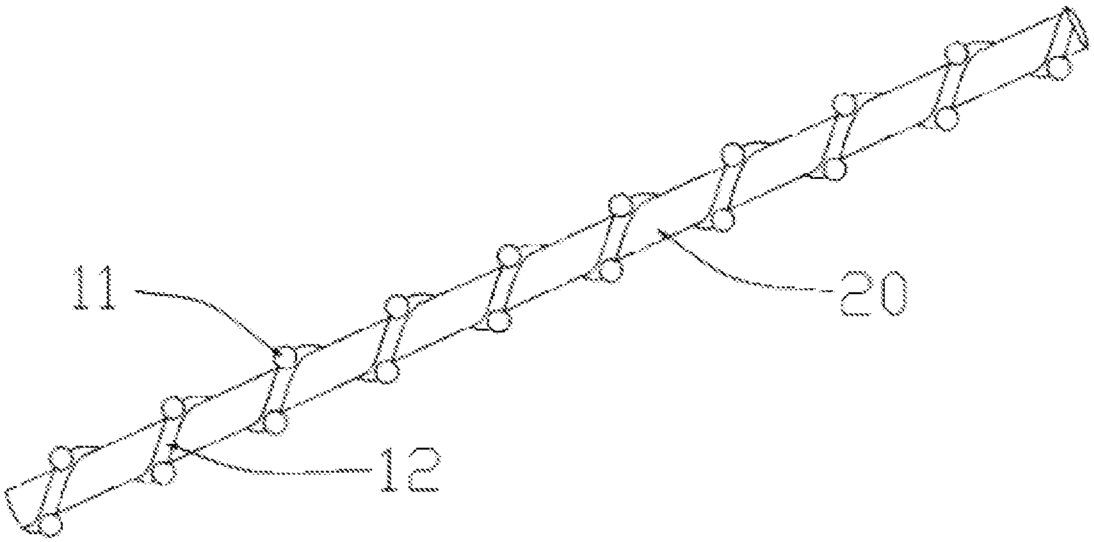
FIG. 3 is an exploded view of a part of the decorative lamp string of FIG. 1.
Figure 4:
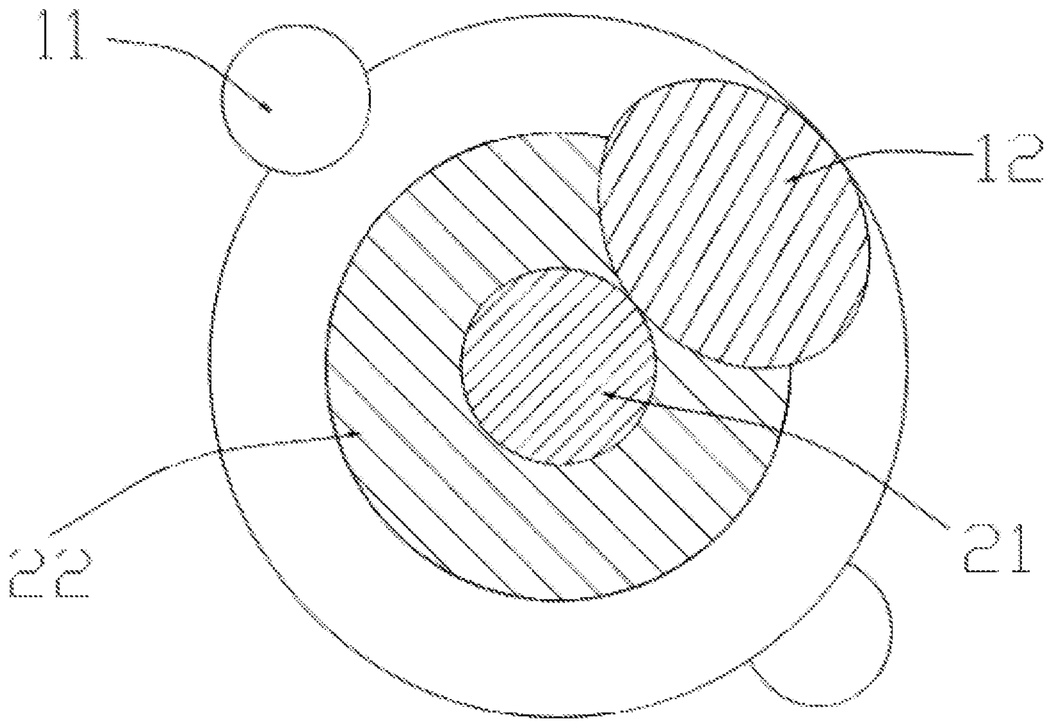
FIG. 4 is a supporting strip of the decorative lamp string of FIG. 1.
Figure 5:
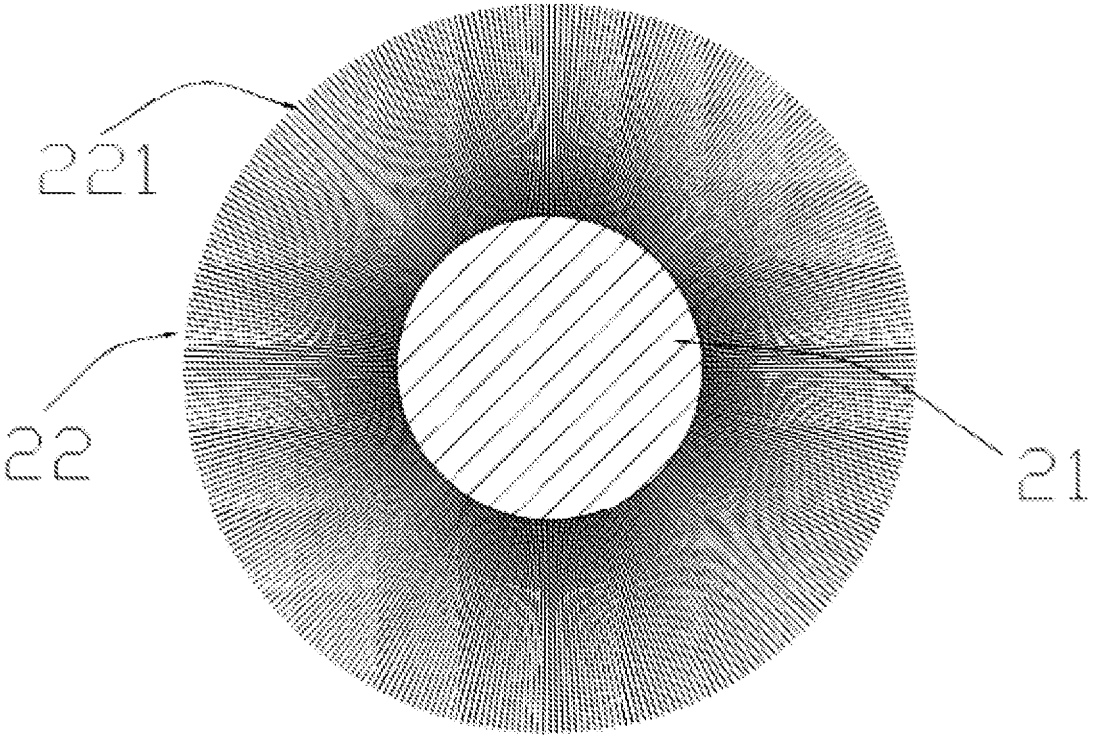
FIG. 5 is a cross-sectional view of the supporting strip of FIG. 4.
Figure 6:
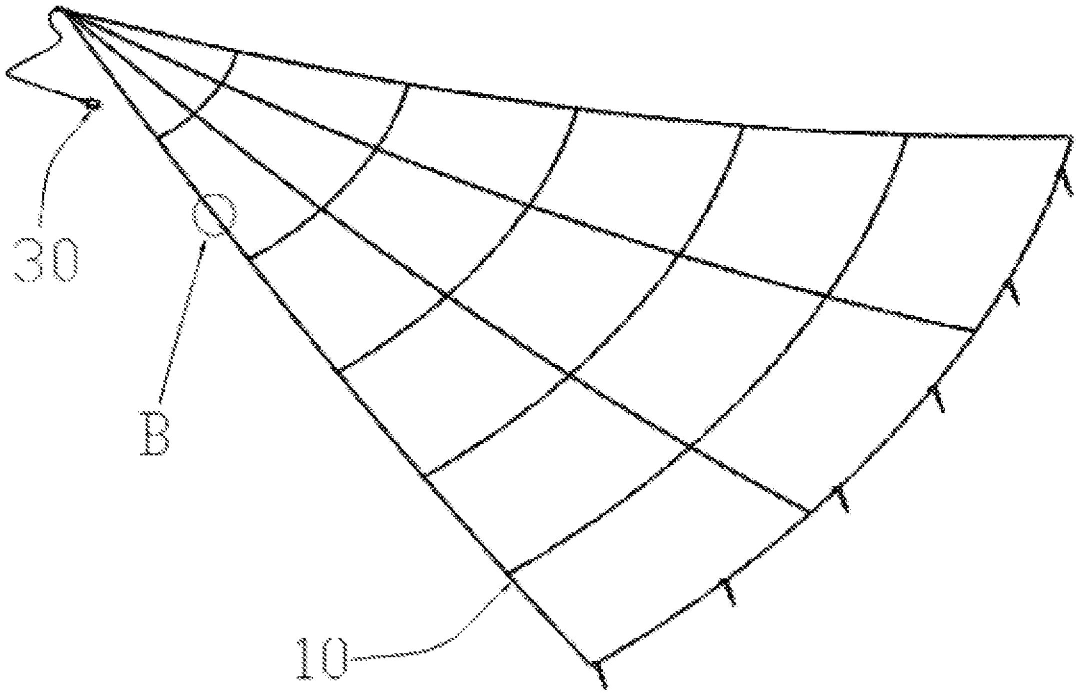
FIG. 6 is an exploded view of a decorative lamp string according to a second embodiment of the present disclosure.
Figure 7:
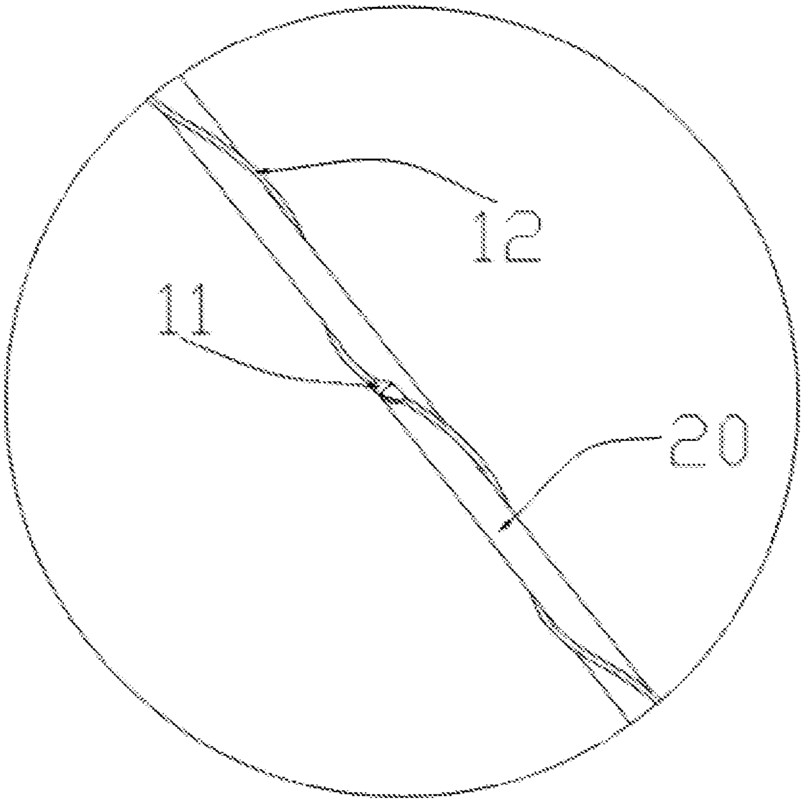
FIG. 7 is an enlarged view of part B of FIG. 6.
Figure 8:
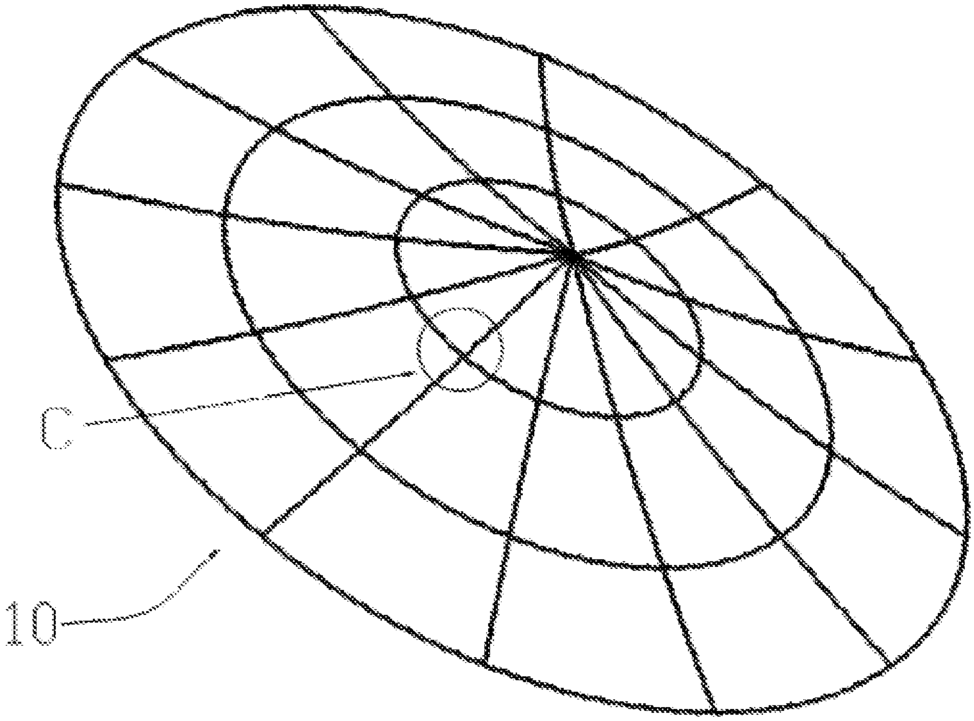
FIG. 8 is an exploded view of a decorative lamp string according to a third embodiment of the present disclosure.
Figure 9:
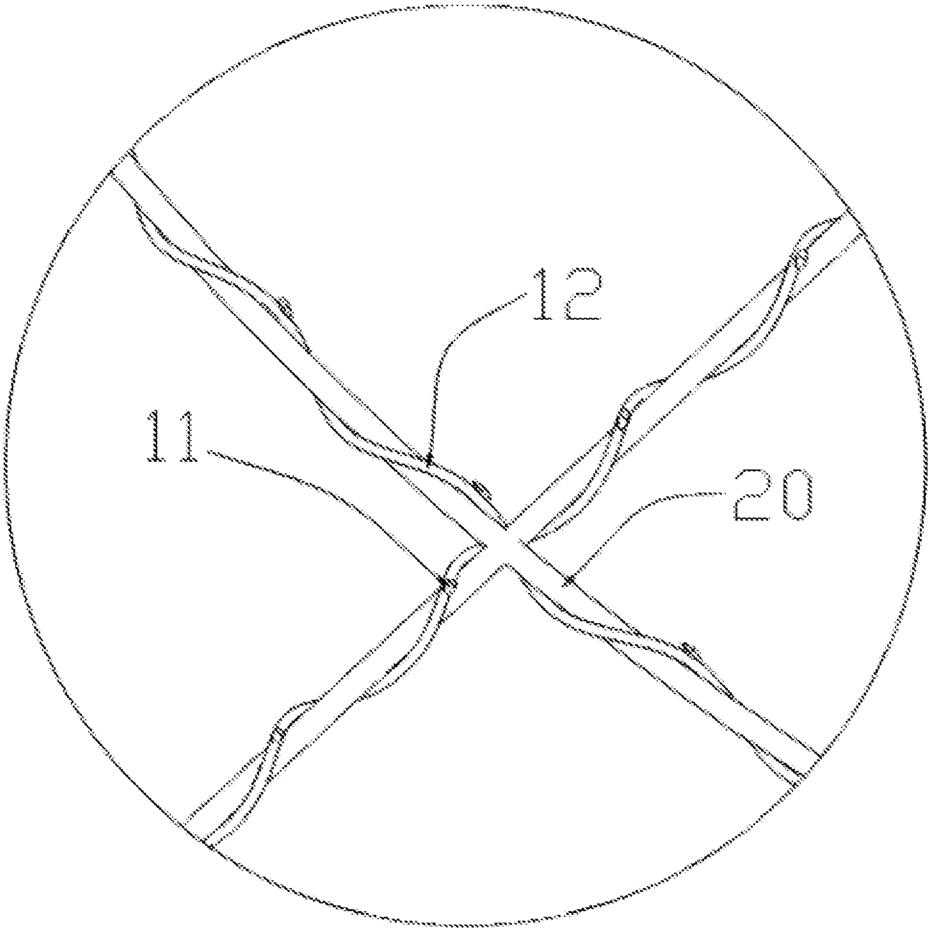
FIG. 9 is an enlarged view of part C of FIG. 8.

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not intended to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to “an” or “one” embodiment in this disclosure are not necessarily to the same embodiment, and such references mean “at least one.”

Referring to FIGS. 1-9, a decorative lamp string includes a lamp string 10 and a supporting strip 20. The lamp string 10 includes a plurality of lamps 11 and a wire 12 connected between two adjacent lamps 11. The wire comprises a plurality of wire portions, and the plurality of lamps are positioned along the wire between the plurality of wire portions. The wire 12 winds around the supporting strip 20 in a spiral fashion. At least one part of the wire 12 is embedded in the supporting strip 20.

Through the above structure, the wire 12 winds around the supporting strip 20 in the spiral fashion and is embedded in the supporting strip 20, which can effectively hide the wire 12 of the lamp string 10, prevent the wire 12 from being exposed, and improve the beauty of the product. At the same time, because there are many lint lines on the surface of the supporting strip 20, light from the lamp string 10 shines on the supporting strip forming a diffuse reflection, making the lighting effect of the lamp string 10 more significant, effectively improving the beauty of the lamp string 10 and enhancing the atmosphere effect of the lamp string 10. Moreover, the combination of the lamp string 10 and the supporting strip 20 can also improve the stability of the product and make the structure of the product more stable. The supporting strip 20 can support the lamp string 10, so as to better wrap and fix on a fixed object, forming more diversified shapes, such as a dear shape, a cobweb shape, etc., to further improve the decorative effect of the decorative lamp string.

In the embodiment, the supporting strip 20 includes a supporting portion 21 and a lint portion 22. The lint portion 22 surrounds the supporting portion 21, and at least a part of the lamp string 10 is embedded in the supporting portion 21. Through the above structure, the supporting portion 21 can effectively support the lamp string 10, so that the structure of the product is more stable, it is more convenient to maintain shape of the product and to make the decorative lamp string into various shapes easily. The lint portion 22 can effectively hide the wire 12 of the decorative lamp string. When the lamp string 10 is wound around the supporting strip 20, a part of the lint portion 22 in contact with the lamp string 10 will be deformed so that the lamp string 10 can be hidden in the lint portion 22 and the wire 12 can be conveniently hidden. Moreover, the light irradiation on the lint portion 22 will produce a diffuse reflection, which can form a better lighting effect.

In this embodiment, the thickness of the lint portion 22 is greater than or equal to the diameter of the wire 12. When the wire 12 is wound around the supporting strip 20, the wire 12 of the lamp string 10 can be completely hidden in the lint portion 22 to prevent the wire 12 from being exposed and ensure the decorative effect of the lamp string 10.

In this embodiment, the lint portion 22 includes a plurality of lint lines 221, a connecting end of the lint line 221 is connected to the supporting portion 21, and a free end of the lint line 221 extends away from the supporting portion 21. Through the above structure, the lint lines 221 extend radially from the support portion 21 to form the lint portion 22. There is a small gap between two adjacent lint lines 221. The light of the lamp string 10 shines on the lint lines 221 and is reflected between the lint lines 221, so that the lighting effect of the lamp string 10 is softer and the decorative effect of the lamp string 10 is improved.

In this embodiment, the supporting strip 20 is made of PVC, PE or PP cotton. The supporting strip 20 made of PVC, PE or PP cotton is cheap and easy to obtain, which greatly reduces production cost of the product.

In this embodiment, the decorative lamp string further includes a connecting head 30. The connecting head 30 is electrically connected to the lamp string 10, and the connecting head 30 is used to connect the lamp string 10 to a main power source. Through the above structure, the connecting head 30 can realize electric connection between the lamp string 10 and external power supply, such as a battery, to ensure power supply of the product, so that the product can continue to shine, while endurance of the product is improved.

In this embodiment, the decorative lamp string further includes an adjusting device 40 electrically connected to the lamp string 10. Through the above structure, the adjusting device 40 can adjust the lighting effect, such as color of the light, shade and flickering effect, so that users can freely adjust the lighting effect, and obtain various user experiences.

In this embodiment, the adjusting device 40 also includes a switching element 41, which is used for connecting or disconnecting the lamp string 10 to a power supply. Through the above structure, the switching element 41 can easily control electric connection or electric disconnection between the lamp string 10 and the power supply, it is convenient for the user to operate, it also can save energy and achieve green environmental protection effect.

In this embodiment, the lamp string 10 is a copper wire lamp string. Through the above structure, the structure of the copper wire lamp string not only has the advantages of small volume, long service life, high brightness, low quantity of heat in the protection of illumination to ensure the light effect, but also has the advantages of low energy consumption, energy conservation and environmental protection. Further, the copper wire lamp string is malleable so that it is convenient for the users to make the decorative lamp string into various shapes (such as a deer shape or a mesh shape) to improve decorative effect of the product.

In this embodiment, the cross-sectional area of the wire 12 is not greater than 0.2 square mm, which is easier to hide in the lint portion of the supporting strip 20, so as to improve the beauty of the product. On the other hand, users can choose more kinds of supporting strip to improve applicability of the product.

Figure 10:
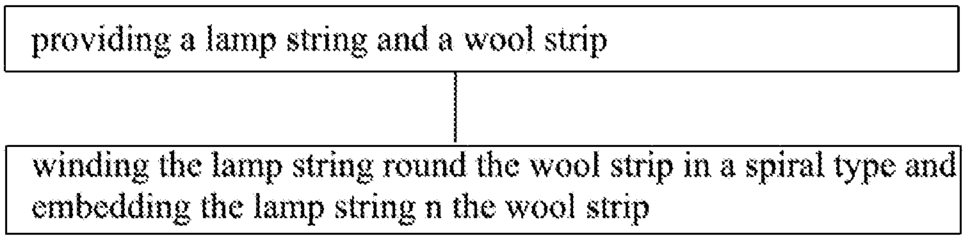
FIG. 10 is a flow chart of a method for manufacturing a decorative lamp string according to an embodiment of the present disclosure.

Referring to FIG. 10, a method for manufacturing a decorative lamp string includes providing a lamp string 10 and a supporting strip 20, winding the wire 12 around the wool strip 20 in a spiral fashion and embedding the wire 12 in the supporting strip 20.

Through the above structure, the wire 12 winds around the supporting strip 20 in the spiral fashion and is embedded in the supporting strip 20, which can effectively block the wire 12 of the lamp string 10, prevent the wire 12 from being exposed, and improve the beauty of the product. At the same time, because there are many lint lines on the surface of the supporting strip 20, light from the lamp string 10 shines on the supporting strip forming a diffuse reflection, making the lighting effect of the lamp string 10 more significant, effectively improving the beauty of the lamp string 10 and enhancing the atmosphere effect of the lamp string 10. Moreover, the combination of the lamp string 10 and the supporting strip 20 can also improve the stability of the product and make the structure of the product more stable. The supporting strip 20 can support the lamp string 10, so as to better wrap and fix on a fixed object, forming more diversified shapes, such as a deer shape, a cobweb shape, and the like, to further improve decorative effect of the decorative lamp string.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. A decorative lamp string, comprising:

a supporting strip; and a lamp string, the lamp string comprising a plurality of lamps and a wire supporting the plurality of lamps, the wire comprising a plurality of wire portions connected between two adjacent lamps, the lamp string winding around the supporting strip in a spiral type, at least one part of the wire embedded in the supporting strip, wherein the supporting strip comprises a supporting portion and a lint portion, the lint portion surrounds the supporting portion, at least a part of the wire is embedded in the lint portion.

2. The decorative lamp string of claim 1, wherein a thickness of the lint portion is greater than or equal to a diameter of the wire.

3. The decorative lamp string of claim 1, wherein the lint portion comprises a plurality of lint lines, a connecting end of the lint line is connected to the supporting portion, and a free end of the lint line extends a direction far away from the supporting portion.

4. The decorative lamp string of claim 1, the supporting strip is made of PVC, PB or PP cotton.

5. The decorative lamp string of claim 1, wherein the decorative lamp string further comprises a connecting head, the connecting head is electrically connected to the lamp string, and the connecting head is configured to connect the lamp string to mains.

6. The decorative lamp string of claim 1, wherein the lamp string is a copper wire lamp string.

7. The decorative lamp string of claim 1, wherein a cross-sectional area of the wire is not greater than 0.2 square mm.

8. A decorative lamp string, comprising:

a supporting strip; and a lamp string, the lamp string comprising a plurality of lamps and a wire supporting the plurality of lamps, the wire comprising a plurality of wire portions connected between two adjacent lamps, the lamp string winding around the supporting strip in a spiral type at least one part of the wire embedded in the supporting strip, wherein the decorative lamp string further comprises an adjusting device, and the adjusting device is electrically connected to the lamp string, wherein the adjusting device comprises a switching element, the switching element is used for connecting or disconnecting the lamp string to a power supply.

9. A method for manufacturing a decorative lamp string, comprising providing a lamp string and a supporting strip, the lamp string comprising a plurality of lamps and a wire supporting the plurality of lamps, the wire comprising a plurality of wire portions connected between two adjacent lamps, winding the lamp string round the supporting strip in a spiral type and embedding the wire in the supporting strip, wherein the supporting strip comprises a supporting portion and a lint portion, the lint portion surrounds the supporting portion, at least a part of the lamp string is embedded in the lint portion.

10. The method of claim 9, wherein a thickness of the lint portion is greater than or equal to a diameter of the wire.

11. The method of claim 9, wherein the lint portion comprises a plurality of lint lines, a connecting end of the lint line is connected to the supporting portion, and a free end of the lint line extends a direction far away from the supporting portion.

12. The method of claim 9, the supporting strip is made of PVC, PE or PP cotton.

13. The method of claim 9, wherein the decorative lamp string further comprises a connecting head, the connecting head is electrically connected to the lamp string, and the connecting head is configured to connect the lamp string to a power supply.

14. The method of claim 9, the decorative lamp string further comprises an adjusting device, and the adjusting device is electrically connected to the lamp string.

15. The method of claim 14, wherein the adjusting device comprises a switching element, the switching element is used for connecting or disconnecting the lamp string to a power supply.

16. The method of claim 9, wherein the lamp string is a copper wire lamp string.

17. The method of claim 9, wherein a cross-sectional area of the wire is not greater than 0.2 square mm.

* * * * *